US011880672B2

(12) United States Patent
Revuri et al.

(10) Patent No.: US 11,880,672 B2
(45) Date of Patent: Jan. 23, 2024

(54) DYNAMICALLY CONSOLIDATING APPLICABLE UPDATES INTO AN UPDATE RECOMMENDATION

(71) Applicant: Dell Products L.P., Round Rock, TX (US)

(72) Inventors: Chandrasekhar Revuri, Bangalore (IN); Raveendra Babu Madala, Bangalore (IN); Rushyendra Velamuri, Bangalore (IN); Winston X. Fernandes, Sirsi (IN); Praveen Lalgoudar, Bangalore (IN); Abhishek Gupta, Rohini (IN)

(73) Assignee: Dell Products L.P., Round Rock, TX (US)

( * ) Notice: Subject to any disclaimer, the term of this patent is extended or adjusted under 35 U.S.C. 154(b) by 143 days.

(21) Appl. No.: 17/462,528

(22) Filed: Aug. 31, 2021

(65) Prior Publication Data

US 2023/0060767 A1  Mar. 2, 2023

(51) Int. Cl.
*G06F 8/65* (2018.01)
*G06F 8/61* (2018.01)

(52) U.S. Cl.
CPC . *G06F 8/65* (2013.01); *G06F 8/61* (2013.01)

(58) Field of Classification Search
USPC ......................................................... 717/168
See application file for complete search history.

(56) References Cited

U.S. PATENT DOCUMENTS

| 2003/0140128 A1* | 7/2003 | Cox | H04L 41/0873 |
| | | | 717/171 |
| 2013/0174138 A1* | 7/2013 | Kania | G06F 8/65 |
| | | | 717/171 |
| 2014/0007067 A1* | 1/2014 | Nelson | G06F 8/654 |
| | | | 717/168 |
| 2014/0007073 A1* | 1/2014 | Cavalaris | G06F 8/63 |
| | | | 717/172 |
| 2014/0047426 A1* | 2/2014 | Raje | G06F 8/65 |
| | | | 717/168 |
| 2014/0108469 A1* | 4/2014 | Majka | G06F 16/11 |
| | | | 707/821 |

(Continued)

OTHER PUBLICATIONS

Mateus Rodrigues Costa; "How to Install Only Security and Bugfixes Updates with DNF"; Fedora Magazine (.org) website [full url in ref.]; Aug. 30, 2021 (Year: 2021).*

*Primary Examiner* — Qing Chen
*Assistant Examiner* — Clint Thatcher
(74) *Attorney, Agent, or Firm* — Larson Newman, LLP

(57) ABSTRACT

A system and method are disclosed for performing, by a processor of an information handling system, an inventory of updateable components of the information handling system. The system and method also includes retrieving an update path catalog for the updateable component and determining published updates between a current version and a target version of the updateable component according to the update path catalog. In addition, the system and method includes determining update recommendations based on the published updates between the current version and the target version. Finally, the system and method includes consolidating the update recommendations into the consolidated update recommendation according to a criterion.

20 Claims, 4 Drawing Sheets

(56) References Cited

U.S. PATENT DOCUMENTS

| | | | |
|---|---|---|---|
| 2017/0034023 A1* | 2/2017 | Nickolov | H04L 43/0817 |
| 2017/0242679 A1* | 8/2017 | Sangameswaran | G06F 8/65 |
| 2019/0384589 A1* | 12/2019 | Du | G06F 17/15 |
| 2020/0210166 A1 | 7/2020 | Gore et al. | |
| 2020/0241887 A1 | 7/2020 | Vidyadhara et al. | |
| 2020/0349134 A1* | 11/2020 | Peterkin | G06F 3/0482 |
| 2021/0081188 A1* | 3/2021 | Rajagopalan | G06F 8/65 |
| 2021/0168046 A1 | 6/2021 | Madala et al. | |
| 2021/0263724 A1* | 8/2021 | Ye | G06F 8/71 |
| 2022/0334826 A1* | 10/2022 | Iyer | G06F 8/71 |

* cited by examiner

DYNAMICALLY CONSOLIDATING APPLICABLE UPDATES INTO AN UPDATE RECOMMENDATION

FIELD OF THE DISCLOSURE

The present disclosure generally relates to information handling systems, and more particularly relates to dynamically consolidating applicable updates into an update recommendation.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system and method are disclosed for performing, by a processor of an information handling system, an inventory of updateable components of the information handling system. The system and method also includes retrieving an update path catalog for the updateable component and determining published updates between a current version and a target version of the updateable component according to the update path catalog. In addition, the system and method includes determining update recommendations based on the published updates between the current version and the target version. Finally, the system and method includes consolidating the update recommendations into the consolidated update recommendation according to a criterion.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings. However, other teachings can certainly be used in this application. The teachings can also be used in other applications and with several different types of architectures, such as distributed computing architectures, client/server architectures, or middleware server architectures and associated resources.

To address or fix certain issues and/or to enhance the functionality of one or more components in an information handling system, updates are provided periodically. The updates are typically packaged along with metadata to support features or provide information regarding the update and/or update package such as integrity, file descriptors, applicability, criticality, dependencies, severity, etc. An update catalog that includes information about the latest updates available, such as a version number and release date, is typically generated and published.

Figure 1:
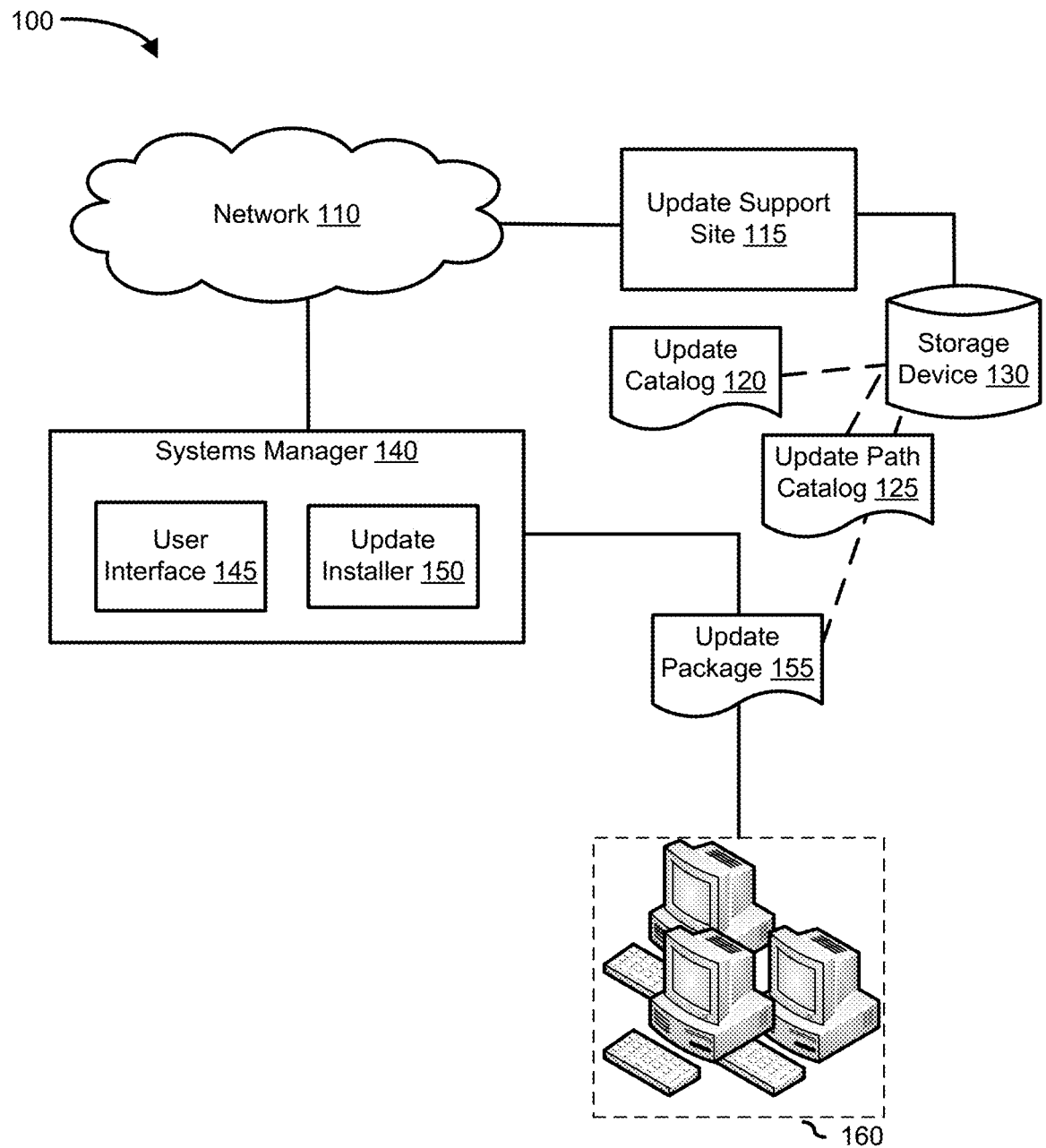
FIG. 1 is a block diagram illustrating a system for dynamically consolidating applicable updates into an update recommendation, according to an embodiment of the present disclosure.

FIG. 1 illustrates a system 100 for consolidating applicable updates into an update recommendation before installing the updates based on the consolidated recommendation. System 100 includes a network 110, an update support site 115, a storage device 130, a systems manager 140, and managed resources 160. Systems manager 140 includes a user interface 145 and an update installer 150. Systems manager 140 may be configured to manage deployment of software and/or firmware updates to managed resources 160 using update installer 150. The updates, such as BIOS firmware, device firmware and drivers, software, and application updates, may be deployed from update support site 115 via network 110. Update support site 115 may be an original equipment manufacturer (OEM) support site or an update support site maintained by the developer of an operating system such as Windows® Update, or an update support site maintained by a vendor or manufacturer of a device or component. Network 110 can be implemented using one or more servers, routers, or other suitable devices that are used to facilitate network communications over a wired or wireless network, an optical network, or other suitable communications media. Although update support site 115 is shown located remotely, the update support site can be located locally on-premise from systems manager 140 and managed resources 160.

Update support site 115 may be communicatively coupled to storage device 130 that may be any suitable storage device such as Host Bus Adapters (HBAs), disk drive devices, Solid State Drives (SSDs) such as Non-Volatile Memory-Express (NVMe) devices, or the like, or other persistent data storage devices, as needed or desired. Storage device 130 may be used to store updates and/or data files to be used in determining updates to be applied to managed resources 160. In this example, storage device 130 stores an update catalog 120, an update path catalog 125, and an update package 155. The update package includes one or more update files also referred to as updates that are combined into a package format such as a Microsoft® cabinet (CAB) file or a .zip file format. The update package may include an update also referred to as a payload which may be compressed, self-extracting files. Update package 155 may include a metadata file that includes information regarding the update(s) included in the package such as its version number, criticality or importance level, date of release, or similar. The metadata file may be of various formats such as an extensible markup language (XML) file, a JavaScript object notation (JSON) file, or similar which systems manager 140 can parse.

Update catalog 120 may include information associated with the updates and/or update packages such as an identifier, download uniform resource locator (URL), or location of the updates, name of the company organization that created the update catalog, date/time the update catalog was imported or modified, the criticality of the update(s), version number, supported operating system, supported operating system build number, etc. Update catalog 120 with update path catalog 125 may be used by systems manager 140 to provide automated BIOS, firmware, driver, component, application, and software updates to managed resources 160.

Growing computational needs and server high availability requirements may force a system administrator to apply the updates less frequently. The system administrator may also decide whether to apply an update based on one or more criteria, such as criticality, version number, release date, etc. However, update catalogs typically do not include enough information for the system administrator to use in making his decision. In addition, because the update catalog may only show the latest updates, the system administrator may miss earlier updates. For example, the update catalog may only show information associated with the latest available update, let's say BIOS version 2.7.7, with a criticality level of recommended, instead of urgent or optional. The system administrator may decide not to install this particular version because it is not a critical/urgent update. However, the system administrator may not be aware that an older urgent update BIOS version 2.4.8 exists. By missing the urgent update, the information handling system that is managed by the system administrator may now be non-compliant with the organization's security standards and is vulnerable to viruses, malware, and other security issues or attacks.

To address these and other concerns, the present disclosure provides context-specific consolidated update recommendation, referred herein as "update path catalog," based on criteria specified by a user such as a system administrator. The update path catalog includes detailed information about all of the updates available for a particular component such as criticality level. In addition, each update in the update catalog may include a reference to a corresponding update path catalog. The update path catalog may also include information for more than one updateable component. The present disclosure includes an algorithm to determine the update path for one or more updates applicable to a component, device, or information handling system based on one or more criteria. Also, the update path catalog is automatically updated when an update is published.

Systems manager 140 may be configured to perform an inventory of devices and/or components of one or more information handling systems being updated, such as of managed resources 160. Performing the inventory includes determining the current software or firmware versions of the devices and/or components of the information handling system. For each one of the devices and/or components to be updated, also referred herein as updateable components, the systems manager retrieves an update patch catalog such as update path catalog 125 associated with the updateable component from storage device 130 and determines the published or available updates between a current version of the device and/or component and a target version. The target version may be the latest software or firmware version for that device or component based on update catalog 120. Typically, the target version of the updateable component is greater than its current version.

Systems manager 140 may apply an algorithm based on the metadata information in the update catalog and the update path catalog to determine the applicable updates. The systems manager may parse update path catalog 125 and use the information to consolidate or aggregate update recommendations for the updateable component based on one or more criteria generating a context-specific consolidated recommendation. A criterion may have been the default criterion or one specified by the system administrator via user interface 145. For example, the system administrator may use the importance level of the update as the criterion. The importance level may be one of "urgent," "recommended," or "optional." The system administrator may decide to add another criterion such as the date of release or the version number of the update.

User interface 145 provides the user the ability to manage the updates to be applied on managed resources 160. For example, the system administrator can use the user interface to specify a criterion or use the default criterion that may be used by system manager 140 in determining a consolidated update recommendation. The system administrator may also use the user interface to identify which if any of the updates to install based on the recommendation.

As stated above, system manager 150 may generate a consolidated recommendation for each of the updateable components based on one or more criteria. After generating the consolidated recommendation, system manager 150 may then automatically apply the updates based on the consolidated recommendation. In another embodiment, systems manager 140 may display the consolidated recommendation to the system administrator via user interface 145 for approval prior to installing the updates.

Update installer 150 may be configured to apply or install the updates based on the consolidated recommendation as directed by system manager 150. Update installer 150 may automatically install the updates based on the consolidated recommendation generated by the system manager or as approved by the system administrator. In addition, the user or system administrator may determine to install a subset of the recommended updates instead of the optional updates in addition to installing urgent updates.

Those of ordinary skill in the art will appreciate that the configuration, hardware, and/or software components of system 100 depicted in FIG. 1 may vary. For example, the illustrative components within system 100 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
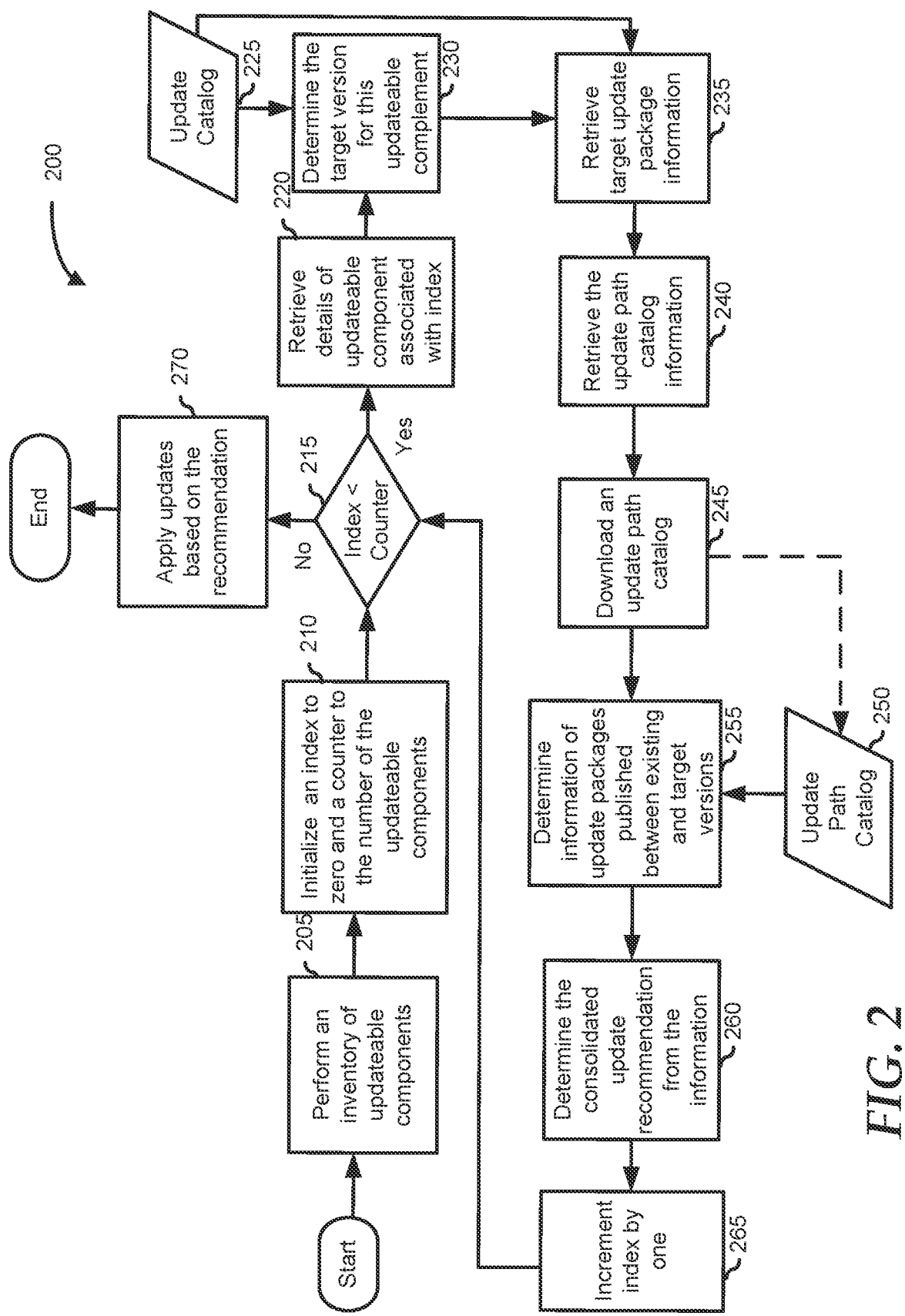
FIG. 2 is a flowchart illustrating a method for dynamically consolidating applicable updates into an update recommendation, according to an embodiment of the present disclosure.

FIG. 2 shows a flowchart of a method 200 for dynamically consolidating applicable updates into an update recommendation. One of skill in the art will appreciate that this flowchart explains a typical example, which can be extended to advanced applications or services in practice. Method 200 may be performed by systems manager 140 of FIG. 1 and typically starts at block 205 where the systems manager performs an inventory of updateable components of the information handling system. During the inventory, information associated with each of the updateable components such as the current software or firmware version may be determined. At block 210, an index is initialized to zero and a counter is initialized to the number of the updatable components in the information handling system. The index represents a number associated with an updateable component being processed. While the counter represents the number of the updateable components in the information handling system. The method iterates through and processes each updateable component starting at the updateable component at index zero. At decision block 215, the method determines whether the value of the index is less than the value of the counter. If the value of the index is less than the value of the counter, then the method proceeds to block 220. If the value of the index is not less than the counter, then the method proceeds to block 240 where the updates are applied based on the recommendation.

At block 220, the system manager may retrieve details associated with the updateable component currently being processed. At block 230, the method determines the target version for the updateable component being processed based on information included in an update catalog 225 for the updateable component which is similar to update catalog 120 of FIG. 1. At block 235, the update package information of the target version for the updateable component is retrieved. At block 240, the update path catalog information associated with the updateable component is retrieved from update catalog 225. At block 245, an update path catalog 250, which is similar to update path catalog 125, is downloaded based on the update path catalog information from block 240. At block 255, the method determines the updates or update packages published between the current version and the target version of the updateable component.

At block 260, the method determines the consolidated update recommendation based on the information of the published updates or update packages at block 255. The systems manager may consolidate or aggregate the update information based on a criterion. A weighting factor may also be used accordingly. For example, assuming the criterion criticality is used, and then a weighting factor may be applied according to the criticality level such as "urgent," "recommended," and "optional." Further assuming that the critically level urgent is more critical than the level recommended which in turn is more critical than the level optional. As such, urgent updates may be assigned more weight than recommended updates which in turn is given more weight than optional updates.

In one embodiment, if the updateable component has a version v1 and the target or latest available update is version is v4, then the update path catalog may be retrieved for that updateable component. Based on the update path catalog, it may be determined that several updates between version v1 and version v4 are available, such as versions v2 and v3. A consolidated update recommendation based on the available updates may be determined based on the criterion selected. Assuming that the criticality is selected and adjusting for the weighting factor, the recommendation may be consolidated as follows:

Consolidated Update Recommendation=Maximum {criticality (v2), criticality (v3), criticality (v4)}
Consolidated Update Recommendation=Maximum {Recommended, Urgent, Recommended)}
Consolidated Update Recommendation=Urgent Assuming that version v2 is urgent while versions v3 and v4 are recommended then the highest weight is associated with the criticality level of urgent. As such, update version v4 in this example is assigned the criticality level of urgent. Because the updates are cumulative, version v2 and version v3 are both installed when and version v4 is installed. If the criticality levels of the update versions are the same, then the system manager may consolidate the recommended updates according to another criterion such as its version numbers, wherein the updates may be installed from the earliest version to the latest version or vice versa. In another example, if the criterion used is the date of release, then the highest weight may be associated with the latest date and the lowest weight to the earliest date or vice versa. Accordingly, if the criterion used is version number, then the highest weight may be associated with the highest version number and the lowest weight to the lowest version number or vice versa. After processing the current updateable component, increment the index by one and proceed to decision block 215.

Figure 3:
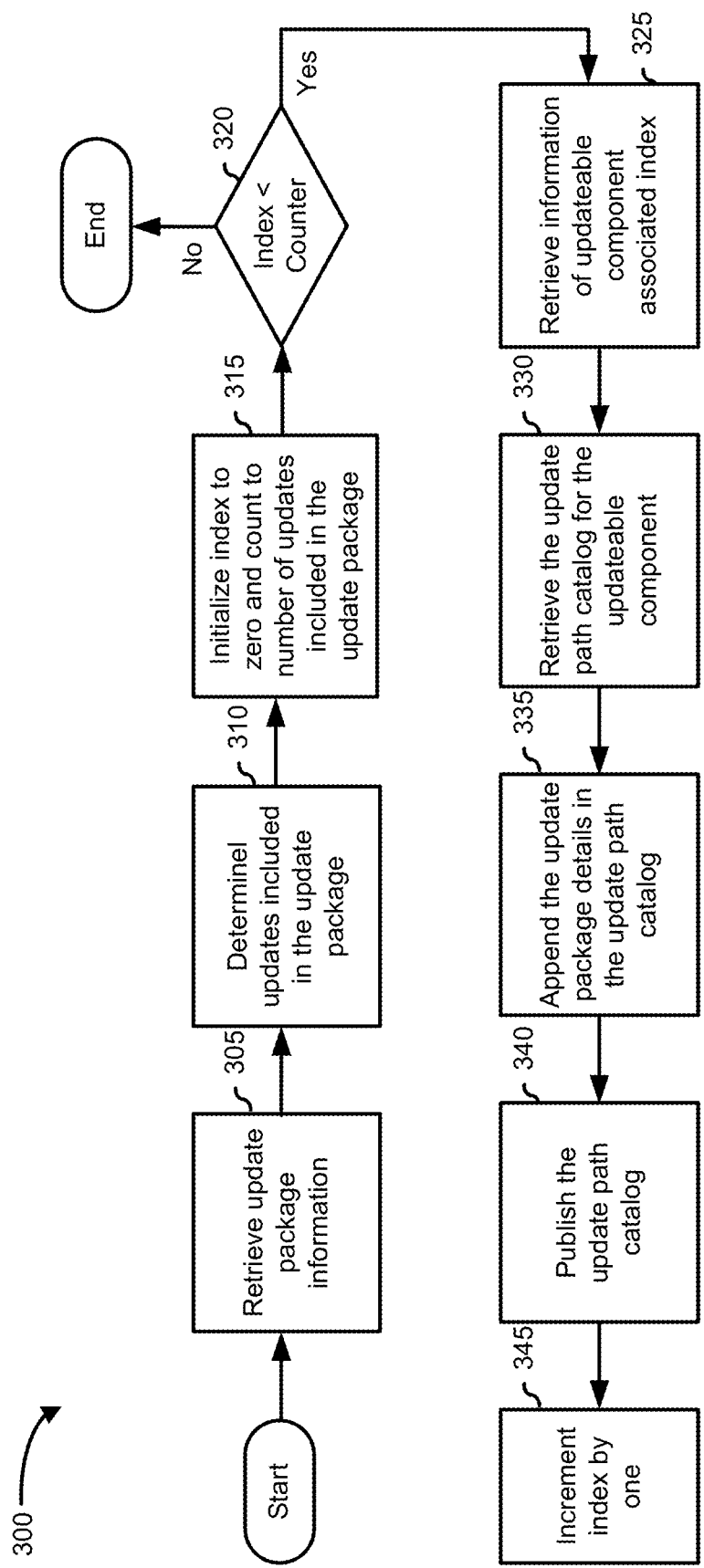
FIG. 3 is a flowchart illustrating a method for updating an update path catalog, according to an embodiment of the present disclosure.

FIG. 3 illustrates a method 300 for keeping the update path catalog up to date which may be performed by a systems manager similar to systems manager 140 of FIG. 1. Before the start of method 400, an event providing notification that an update or an update package is published may be received by the systems manager. For example, the systems manager may subscribe to an update support site, similar to update support site 115 of FIG. 1, to receive notification if an update or an update package is published.

Method 300 typically starts at block 305, where information associated with the update package is retrieved such as from an update catalog and/or metadata associated with the update package, such as download location, supported components, version number, release date, supported operating system, etc. At block 310, the systems manager determines what updates are included in the update package. At block 315, the method initializes the value of a parameter index to zero and the value of a counter to the number of the updates included in the update package. The index represents the number associated with an updateable component being processed. While the counter represents the number of the updates in the update package. The method iterates through and processes each update starting at the update at index zero.

At decision block 320, the method determines whether the value of the index is less than the value of the counter. If the value of the index is less than the value of the counter, then the method proceeds to block 325. If the value of the index is not less than the value of the counter, that is there are no additional updates to process, then the method ends. At block 325, the method retrieves information associated with the updateable component associated with the value of the index, wherein the current updateable component is associated with the index. For example, the method retrieves a serial number, a service tag number, a model number, etc. of the updateable component. At block 330, the update path catalog for the updateable component is retrieved based on the information retrieved at block 325. At block 335, the update package details from block 305 are appended to the information in the update path catalog. At block 340, the update path catalog is published or promoted. At block 345, the value of the parameter index is incremented by one.

Although FIG. 2, and FIG. 3 show example blocks of method 200 and method 300 in some implementation, method 200 and method 300 may include additional blocks, fewer blocks, different blocks, or differently arranged blocks than those depicted in FIG. 2 and FIG. 3. Those skilled in the art will understand that the principles presented herein may be implemented in any suitably arranged processing system. Additionally, or alternatively, two or more of the blocks of method 200 and method 300 may be performed in parallel. For example, block 260 and block 265 of method 200 may be performed in parallel.

Figure 4:
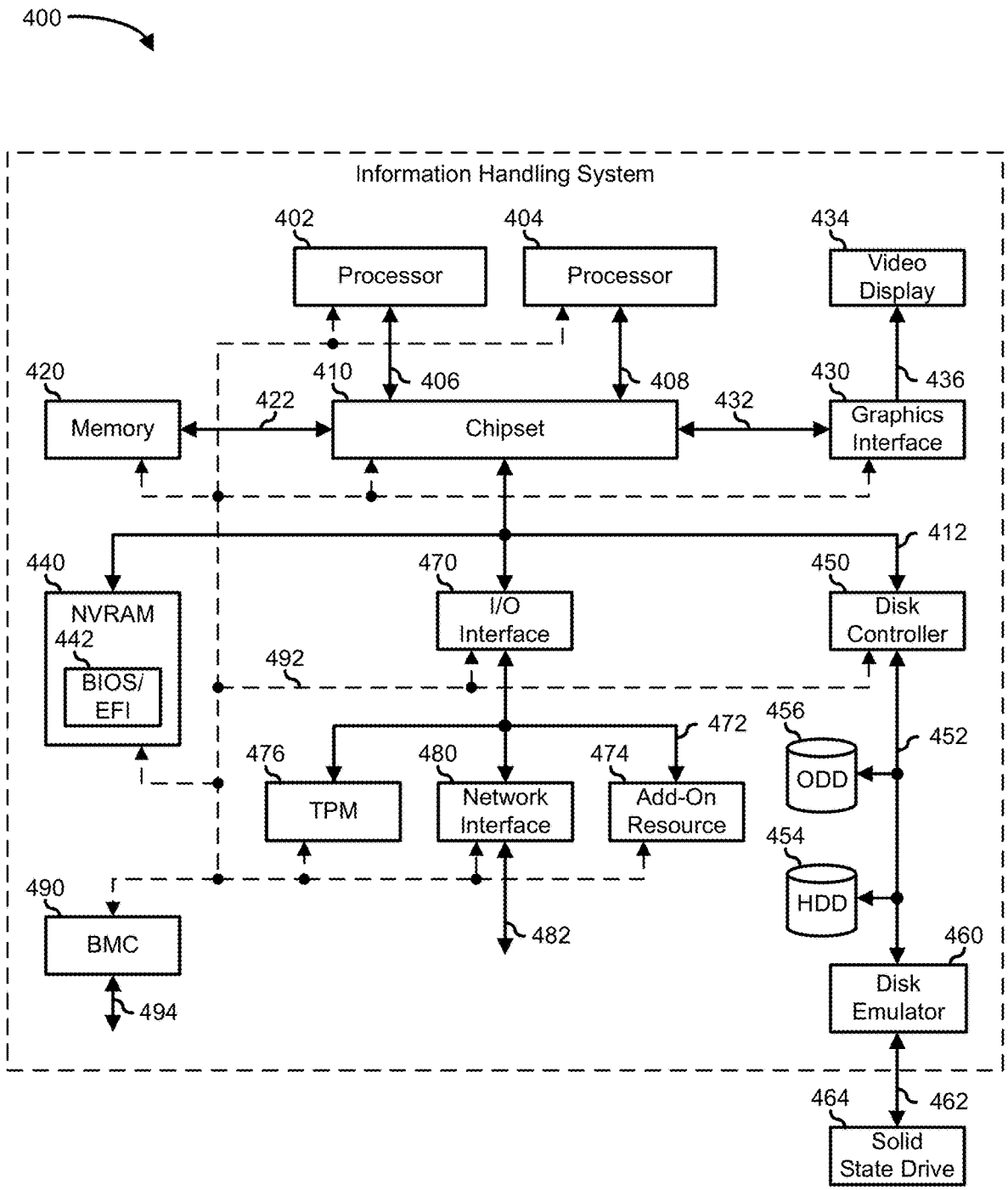
FIG. 4 is a block diagram illustrating a generalized information handling system, according to an embodiment of the present disclosure.

FIG. 4 illustrates a generalized embodiment of an information handling system 400 including processors 402 and 404, a chipset 410, a memory 420, a graphics adapter 430 connected to a video display 434, a non-volatile RAM (NV-RAM) 440 that includes a basic input and output system/extensible firmware interface (BIOS/EFI) module 442, a disk controller 450, a hard disk drive (HDD) 454, an optical disk drive 456, a disk emulator 460 connected to a solid-state drive (SSD) 464, an input/output (I/O) interface 470 connected to an add-on resource 474 and a trusted platform module (TPM) 476, a network interface 480, and a baseboard management controller (BMC) 490. Processor 402 is connected to chipset 410 via processor interface 506, and processor 404 is connected to the chipset via processor interface 408. In a particular embodiment, processors 402 and 404 are connected together via a high-capacity coherent fabric, such as a HyperTransport link, a QuickPath Interconnect, or the like. Chipset 410 represents an integrated circuit or group of integrated circuits that manage the data flow between processors 402 and 404 and the other elements of information handling system 400. In a particular embodiment, chipset 410 represents a pair of integrated circuits, such as a northbridge component and a southbridge component. In another embodiment, some or all of the functions and features of chipset 410 are integrated with one or more of processors 402 and 404.

Memory 420 is connected to chipset 410 via a memory interface 422. An example of memory interface 422 includes a Double Data Rate (DDR) memory channel and memory 420 represents one or more DDR Dual In-Line Memory Modules (DIMMs). In a particular embodiment, memory interface 422 represents two or more DDR channels. In another embodiment, one or more of processors 402 and 404 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 420 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 430 is connected to chipset 410 via a graphics interface 432 and provides a video display output 436 to a video display 434. An example of a graphics interface 432 includes a Peripheral Component Interconnect-Express (PCIe) interface and graphics adapter 430 can include a four-lane (×4) PCIe adapter, an eight-lane (×8) PCIe adapter, a 16-lane (×16) PCIe adapter, or another configuration, as needed or desired. In a particular embodiment, graphics adapter 430 is provided down on a system printed circuit board (PCB). Video display output 436 can include a Digital Video Interface (DVI), a High-Definition Multimedia Interface (HDMI), a DisplayPort interface, or the like, and video display 434 can include a monitor, a smart television, an embedded display such as a laptop computer display, or the like.

NV-RAM 440, disk controller 450, and I/O interface 470 are connected to chipset 410 via an I/O channel 412. An example of I/O channel 412 includes one or more point-to-point PCIe links between chipset 410 and each of NV-RAM 440, disk controller 450, and I/O interface 470. Chipset 410 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 440 includes BIOS/EFI module 442 that stores machine-executable code (BIOS/EFI code) that operates to detect the resources of information handling system 400, to provide drivers for the resources, to initialize the resources, and to provide common access mechanisms for the resources. The functions and features of BIOS/EFI module 442 will be further described below.

Disk controller 450 includes a disk interface 452 that connects the disc controller to a hard disk drive (HDD) 454, to an optical disk drive (ODD) 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an institute of electrical and electronics engineers (IEEE) 1394 (Firewire) interface, a proprietary interface, or a combination thereof. Alternatively, SSD 464 can be disposed within information handling system 400.

I/O interface 470 includes a peripheral interface 472 that connects the I/O interface to add-on resource 474, to TPM 476, and to network interface 480. Peripheral interface 472 can be the same type of interface as I/O channel 412 or can be a different type of interface. As such, I/O interface 470 extends the capacity of I/O channel 412 when peripheral interface 472 and the I/O channel are of the same type, and the I/O interface translates information from a format suitable to the I/O channel to a format suitable to the peripheral interface 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on a separate circuit board or add-in card disposed within information handling system 400, a device that is external to the information handling system, or a combination thereof.

Network interface 480 represents a network communication device disposed within information handling system 400, on a main circuit board of the information handling system, integrated onto another component such as chipset 410, in another suitable location, or a combination thereof. Network interface 480 includes a network channel 482 that provides an interface to devices that are external to information handling system 400. In a particular embodiment, network channel 482 is of a different type than peripheral interface 472, and network interface 480 translates information from a format suitable to the peripheral channel to a format suitable to external devices.

In a particular embodiment, network interface 480 includes a NIC or host bus adapter (HBA), and an example of network channel 482 includes an InfiniBand channel, a Fibre Channel, a Gigabit Ethernet channel, a proprietary channel architecture, or a combination thereof. In another embodiment, network interface 480 includes a wireless communication interface, and network channel 482 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 482 can be connected to an external network resource (not illustrated). The network resource can include another information handling system, a data storage system, another network, a grid management system, another suitable resource, or a combination thereof.

BMC 490 is connected to multiple elements of information handling system 400 via one or more management interface 492 to provide out-of-band monitoring, maintenance, and control of the elements of the information handling system. As such, BMC 490 represents a processing device different from processor 402 and processor 404, which provides various management functions for information handling system 400. For example, BMC 490 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 490 can vary considerably based on the type of information handling system. BMC 490 can operate in accordance with an Intelligent Platform Management Interface (IPMI). Examples of BMC 490 include an Integrated Dell® Remote Access Controller (iDRAC).

Management interface 492 represents one or more out-of-band communication interfaces between BMC 490 and the elements of information handling system 400, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 400, that is apart from the execution of code by processors 402 and 404 and procedures that are implemented on the information handling system in response to the executed code.

BMC 490 operates to monitor and maintain system firmware, such as code stored in BIOS/EFI module 442, option ROMs for graphics adapter 430, disk controller 450, add-on resource 474, network interface 480, or other elements of information handling system 400, as needed or desired. In particular, BMC 490 includes a network interface 494 that can be connected to a remote management system to receive firmware updates, as needed or desired. Here, BMC 490 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 490 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 490, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 490 is included on a main circuit board (such as a baseboard, a motherboard, or any combination thereof) of information handling system 400 or is integrated onto another element of the information handling system such as chipset 410, or another suitable element, as needed or desired. As such, BMC 490 can be part of an integrated circuit or a chipset within information handling system 400. An example of BMC 490 includes an iDRAC or the like. BMC 490 may operate on a separate power plane from other resources in information handling system 400. Thus BMC 490 can communicate with the management system via network interface 494 while the resources of information handling system 400 are powered off. Here, information can be sent from the management system to BMC 490 and the information can be stored in a RAM or NV-RAM associated with the BMC. Information stored in the RAM may be lost after power-down of the power plane for BMC 490, while information stored in the NV-RAM may be saved through a power-down/power-up cycle of the power plane for the BMC.

Information handling system 400 can include additional components and additional busses, not shown for clarity. For example, information handling system 400 can include multiple processor cores, audio devices, and the like. While a particular arrangement of bus technologies and interconnections is illustrated for the purpose of example, one of skill will appreciate that the techniques disclosed herein are applicable to other system architectures. Information handling system 400 can include multiple central processing units (CPUs) and redundant bus controllers. One or more components can be integrated together. Information handling system 400 can include additional buses and bus protocols, for example, I2C and the like. Additional components of information handling system 400 can include one or more storage devices that can store machine-executable code, one or more communications ports for communicating with external devices, and various input and output (I/O) devices, such as a keyboard, a mouse, and a video display.

For purpose of this disclosure information handling system 400 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 400 can include processing resources for executing machine-executable code, such as processor 402, a programmable logic array (PLA), an embedded device such as a System-on-a-Chip (SoC), or other control logic hardware. Information handling system 400 can also include one or more computer-readable media for storing machine-executable code, such as software or data.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising: performing, by a processor of an information handling system, an inventory of updateable components of the information handling system; retrieving an update path catalog for each updateable component of the updateable components, wherein the update path catalog includes information about published updates for the updateable component; determining, by a systems manager, that different versions of the published updates between a current version and a target version for the each updateable component of the updateable components is available according to the update path catalog; determining, by the systems manager, update recommendations based on the different versions of the published updates between the current version and the target version; and consolidating, by the systems manager, the update recommendations based on the different versions of the published updates into a consolidated update recommendation according to a criterion; and installing one or more of the published updates based on the consolidated update recommendation.

2. The method of claim 1, wherein the update path catalog is generated for each of the updateable component of the updateable components.

3. The method of claim 1, further comprising displaying the consolidated updated recommendation.

4. The method of claim 1, wherein the consolidating of the update recommendations is based on another criterion.

5. The method of claim 1, wherein the criterion is based on criticality of a published update.

6. The method of claim 1, further comprising updating the update path catalog.

7. The method of claim 1, wherein the target version is greater than the current version.

8. The method of claim 1, further comprising determining the target version of the updateable component.

9. The method of claim 1, wherein an update catalog includes a reference to the update path catalog.

10. The method of claim 1, wherein the consolidating the update recommendations is further based on a weighting factor.

11. An information handling system, comprising: a processor configured to execute instructions; and a systems manager configured to: perform an inventory of updateable components of the information handling system; retrieve an update path catalog for an updateable component of the updateable components, wherein the update path catalog includes information about published updates for the updateable component; determine that different versions of the published updates between a current version and a target version for the each updateable component of the updateable components is available according to the update path catalog; determine update recommendations based on the different versions of the published updates between the current version and the target version; and consolidate the update recommendations based on the different versions of the published updates into a consolidated update recommendation according to a criterion; and an update installer configured to install one or more of the published updates based on the consolidated update recommendation.

12. The information handling system of claim 11, wherein the update path catalog is generated for each of the updateable component of the updateable components.

13. The information handling system of claim 11, wherein the systems manager is further configured to display the consolidated update recommendation.

14. The information handling system of claim 11, wherein an update catalog includes a reference to the update path catalog.

15. The information handling system of claim 11, wherein the criterion is based on criticality of a published update of the published updates.

16. The information handling system of claim 11, wherein the systems manager is further configured to determine the target version of the updateable component.

17. The information handling system of claim 11, wherein the system manager is further configured to consolidate the update recommendations based on a weighting factor.

18. A non-transitory computer-readable medium to store instructions that are executable to perform operations comprising: performing an inventory of updateable components of an information handling system; retrieving an update path catalog for each updateable component of the updateable components, wherein the update path catalog includes information about published updates for the each updateable component;
determining, by a systems manager, that different versions of the published updates between a current version and a target version for the each updateable component of the updateable components is available according to the update path catalog; determining, by the systems manager, update recommendations based on the different versions of the published updates between the current version and the target version; consolidating, by the systems manager, the update recommendations based on the different versions of the published updates into a consolidated update recommendation according to a criterion; and installing one or more of the published updates based on the consolidated update recommendation.

19. The non-transitory computer-readable medium of claim 18, wherein the update path catalog is generated for each of the updateable component of the updateable components.

20. The non-transitory computer-readable medium of claim 18, further comprising displaying the consolidated updated recommendation.

* * * * *